(12) United States Patent
Pierce et al.

(10) Patent No.: US 6,667,385 B2
(45) Date of Patent: Dec. 23, 2003

(54) METHOD OF PRODUCING AMINIUM LACTATE SALT AS A FEEDSTOCK FOR DILACTIC ACID OR DIMER PRODUCTION

(75) Inventors: Sammy Mayfield Pierce, Keokuk, IA (US); Cecil T. Massie, Bloomington, MN (US)

(73) Assignee: Energenetics International, Inc., Keokuk, IA (US)

( * ) Notice: Subject to any disclaimer, the term of this patent is extended or adjusted under 35 U.S.C. 154(b) by 0 days.

(21) Appl. No.: 10/058,553

(22) Filed: Jan. 28, 2002

(65) Prior Publication Data

US 2003/0144463 A1 Jul. 31, 2003

(51) Int. Cl.$^7$ ............................................... C08G 63/08
(52) U.S. Cl. ..................... 528/354; 528/355; 528/359; 525/415; 210/321.83; 210/336; 210/494.1; 210/500.29; 210/600; 210/634
(58) Field of Search ................... 528/354, 359, 528/355; 325/415; 210/321.83, 336, 494.1, 300.29, 600, 634

(56) References Cited

U.S. PATENT DOCUMENTS

| | | | |
|---|---|---|---|
| 5,142,023 A | | 8/1992 | Gruber et al. |
| 5,522,995 A | * | 6/1996 | Cockrem ............... 210/637 |
| 5,563,069 A | | 10/1996 | Yang |
| 5,681,728 A | * | 10/1997 | Miao ..................... 435/136 |
| 5,766,439 A | * | 6/1998 | Eyal et al. .............. 204/524 |
| 6,291,707 B1 | * | 9/2001 | Lin ......................... 562/485 |
| 6,320,077 B1 | | 11/2001 | Eyal et al. |
| 6,392,091 B2 | * | 5/2002 | Lin ......................... 562/485 |
| 2002/0002304 A1 | * | 1/2002 | Lin ......................... 562/485 |
| 2002/0128508 A1 | * | 9/2002 | Eyal et al. .............. 562/485 |
| 2002/0132967 A1 | * | 9/2002 | Ohara et al. ............ 528/354 |

OTHER PUBLICATIONS

James Lunt, Ph.D. and Andrew L. Shafer; *Polylactic Acid Polymers from Corn Potential Applications in the Textiles Industry*; Cargill Dow Polymers LLC, 15305 Minnetonka Boulevard, Minnetonka, MN 55345.

Tillman U. Gerngross and Steven C. Slater; *How Green is Green Plastics?*; Scientific American, Aug., 2000.

Kamm, B., Kamm, M., Richter, K.; *Formulation of Aminium Lactates in Lactic Acid Fermentation Preparation and Characterization of 1,4–Piperazinium–(L,L)–Dilactate Obtained from L(+)–Lactic Acid (Part I)*; Acta Biotechnol 17 (1997) 1, 3–18 Akademic Verlag.

* cited by examiner

*Primary Examiner*—P. Hampton-Hightower
(74) *Attorney, Agent, or Firm*—McKee, Voorhees & Sease, P.L.C.

(57) ABSTRACT

Polylactic acid is produced from dimers of lactic acid in an energy saving manner by contacting a lactic acid source via an extraction membrane with an amine carrier solvent to extract lactic acid across the membrane. One or two membranes may be used. After extraction, the aminium lactate salt is crystallized, disassociated and purified.

18 Claims, 2 Drawing Sheets

METHOD OF PRODUCING AMINIUM LACTATE SALT AS A FEEDSTOCK FOR DILACTIC ACID OR DIMER PRODUCTION

FIELD OF INVENTION

This invention relates to producing dilactic acids or dimers more efficiently by specifically producing aminium lactate salts from lactic acid fermentation broths, e.g. cheese whey. The salts are then thermally dissociated in an inert gas stream at low temperatures in the presence of a cyclization catalyst to form dilactic acids (dimers or diesters). The resulting dilactic acids or diesters may then be used to produce biodegradable polymers such as polylactic acid, and cosmetics and pharmaceuticals.

BACKGROUND OF THE INVENTION

Lactic acid is currently processed into polylactic acid which can be used in many biodegradable polymer applications. Polylactic acid is a multi-functional thermoplastic which can be processed into staple fibers (e.g. carpet fibers), spinning fibers in woven applications to replace (or in blends with) cotton, wool, and polyesters, extruded films for wrappings, injection and thermo-molded products such as polyethylene, propylene and styrene foam products, and thermo-formed plastics such as eating utensils, coatings, etc. Polylactic acid is completely recyclable and is the only major polymer which slowly yet totally biodegrades during composting.

The use of polylactic acid as a mass polymer, until now, has been limited due to the high costs associated with its production, primarily energy costs, making it uncompetitive with similar non-biodegradable petroleum-based polymers and polyesters. There are two major routes to producing polylactic acid directly from the lactic acid monomer. The first route involves removal of water of condensation by using a solvent under high vacuum and temperature. This approach is currently used, for example, by Mitsui Toatsu Chemicals to produce a low to intermediate molecular weight polymer. In a second alternative route, which is considered to be the classical approach to producing polylactic acid, water is removed under milder conditions directly from lactic acid, without solvent, to produce a cyclic (ring closing) intermediate dimer referred to as "dilactic acid." This dimer is then purified under vacuum distillation and then "ring-opening" polymerization is accomplished using heat, without solvent, to produce polylactic acid. This "ring-opening" method of producing polylactic acid is currently used worldwide and is the subject of many patents and other literature. This process, however, suffers from long reaction times and high temperatures and the formation of a number of side reactions and by-products. It usually results in a low (50%–55%) chemical yield for the polylactic acid polymer.

Recently (1992) a third route of producing polylactic acid has been patented and is now being commercially practiced by Cargill, see U.S. Pat. No. 5,142,023 of Aug. 25, 1992. This process relies on the initial production of an impure polylactic acid polymer as a feedstock in the production of polylactic acid. This impure polymer must then be depolymerized using additional energy steps in order to achieve a more pure polylactic acid polymer. These steps are also energy expensive and therefore result in a high production cost associated with producing polylactic acid.

Yet another process of producing dilactic acids or dimers and subsequently producing polylactic acid avoids such energy intensive steps as described in the Cargill process of U.S. Pat. No. 5,142,023. This particular method uses an aminium lactate salt (crystal) instead of an impure polylactic acid as a starting material in the production of dilactic acids or dimers. It is described in Kamm et al, Formation of Aminium Lactates in Lactic Acid Fermentation, Acta Bio-Technol. 17, (1997) 1, 3–18. It describes the use of organic amines (technically called heterocyclic amines, e.g. Piperazine) within the lactic acid fermentation broth to produce aminium lactate (salts). Though aminium lactate salts are referred to specifically, other salts such as ammonium lactate salts may also be produced and used in such a process. Aminium lactate salts have lower melt points of from 80° C.–150° C. and can dissociate in the presence of catalysts (acetonitrile, dioxan, ethylene glycol monoethylether, dimethyl sulphoxid-d6) and low heat to form dilactic acids or dimers. This process completely avoids the need to first produce impure polylactic acid polymers as the feedstock in order to produce such dilactic acids. In this process, however, ultrafiltration and electrocoagulation are used to concentrate and extract the lactic acids and lactate salts. The fallacy of this process, for large scale processing, lies in the use of the organic amines within the fermentation broth and the use of ultrafiltration membranes that require high-energy pressures to remove and separate out the cell mass from the lactic acid/aminium salt. Once the lactic acid is separated from the cell mass, electrocoagulation is then used to bring about the separation or breakdown of the lactic acid from the amine salt in order to concentrate it to a minimum of a 45–85% pure lactic acid. The purer lactic acid is then re-contacted with the organic amine once again, e.g. Piperazine, to form the Piperazine salt once again. In this method the ultrafiltration membranes requires high-energy pressure during operation and often becomes fouled and plugged. It is therefore not suitable for commercial scale processing. In addition, the electrocoagulation step is also not scaleable for commercial use. The Kamm process, as described, requires unnecessary steps of forming the salt from the lactic acid in order to achieve a higher concentration of the lactic acid (45–85%), which then must be re-crystallized to form the salt. This then must be destructured to form the dilactic acid or dimmer. This process results in the production of impure dilactic acids and aminium lactate salts (as an interim step), and the impurities in the lactic acid produced during fermentation within this process has limited the polymer length achievable, mainly due to such lactic acid refining techniques practiced and described in the Kamm process.

It has now been discovered that the aminium lactate salts of the Kamm process can, under certain conditions, become a low cost and low energy step in the production of polylactic acid. The present invention, unlike the Kamm process, does not rely on the concentration of lactic acid to 45–85% purity and thus represents a major energy saving step within the present invention.

Accordingly, as can be seen from the above description, a new and more efficient method is needed for the production of dilactic acids (dimers) that produces interim aminium lactates (salts) more efficiently than that disclosed in the so-called "Kamm process". Such aminium lactates (crystals) could therefore become a new, low-cost feedstock for the production of dilactic acids or dimers. These salts could then be processed more efficiently and with less energy cost to produce such dilactics (acids) or dimer esters and subsequent polylactic acid polymers more economically. It is a primary object of this invention to fulfill this need.

Besides fulfilling this need for a new route to producing dilactic acids (dimers) and subsequent polylactic acid polymers as described, several additional objects and advantages of the present invention are:

(a) to provide a less capital and energy expensive new route to producing dilactic acids (dimers) and subsequent polylactic acid polymers that relies on producing such dilactic acids (dimers) directly from aminium lactate salt (crystal) rather than impure polylactic acid through ring-closing catalysis. Though aminium lactate salts are specifically discussed within the present invention, the present invention is not limited to the use of such specific salts but may include other earth and alkaline salts which may also be produced and used accordingly. Therefore, where mentioned, aminium lactate salts refers also to such other salts as well;

(b) to provide a less expensive and more efficient method to produce aminium lactate salts using methods that are readily commercially scaleable;

(c) to provide a less expensive feedstock in the form of aminium lactate salts that when used in the manufacture of dilactic acids (dimers), and subsequent polylactic acid polymers, will reduce the cost of producing such dilactic acids (and subsequent polylactic acid polymers);

(d) to provide a product in the form of aminium lactate salt that is more readily purifiable over impure polylactic acid polymers and that when used as a feedstock in the manufacture of dilactic acids (dimers), will require less energy, less purification and less process time to dissociate in order to produce such dilactic acids (dimers), and subsequent polylactic acid polymers, therefrom;

(e) to provide a two-step method or process using two membranes in sequence to produce such aminium lactates wherein such method is readily commercially scaleable in order to produce aminium lactate salts more efficiently for use in producing dilactic acids (dimers);

(f) to provide a single step membrane process wherein such process can be readily up-scaled and commercialized to produce aminium lactate salts more efficiently;

(g) to provide a method that uses various lactic acid fermentation broths, or other more concentrated lactic acid solutions, with a highly efficient method of fermenting lactic acid such as is shown in U.S. Pat. No. 5,563,069 entitled: "Extractive Fermentation Using Convoluted Fibrous Bed Bioreactor" combined with a novel method of extracting such fermented lactic acid directly across a membrane into a strong pH base organic amine, e.g Piperazine in solution, as the contacting solution, to form organic amine salts (e.g. aminium lactate salts or other earth or alkaline salts such as ammonium lactate salts). This method further reduces the processing steps, energy costs and subsequent capital costs in the production of polylactic acids directly through employment of the method of this present invention; and finally, (h) to provide a cost competitive method of using organic, renewable products and environmental wastes, e.g. cheese whey, sawdust, forest debris, brush, crop residues, municipal solid wastes, food processing wastes from which to produce dilactic acids (dimers) and subsequent polylactic acid.

Further objects and advantages of the invention will become apparent from a consideration of the drawings and ensuing written description of a preferred embodiment.

SUMMARY OF THE INVENTION

A new method of producing dilactic acids (dimers) by first producing aminium lactate salts by means of membrane technology to extract lactic acid from one side of a membrane to another to form aminium lactate salts, and thereafter using such salts as the starting material or feedstock in the manufacture of such dilactic acids or dimers. In this way, by contacting lactic acid across a membrane with an organic amine solution (e.g. Piperazine) to yield aminium lactate salts, which can then be dissociated in the presence of an inert gas at low temperature and in the presence of a cyclization catalyst (ring closing) to form dilactic acids or dimers, lengthy, expensive process steps are avoided. The dimers which may subsequently be polymerized to polylactic acid using conventional technologies.

BRIEF DESCRIPTION OF DRAWINGS

FIG. 1 shows the present invention and the preferred embodiment whereby two membranes are used in the production of aminium lactate salts.

FIG. 2 shows an alternative step within the present invention which employs a single membrane (as opposed to two) to produce aminium lactate salts.

DETAILED DESCRIPTION OF A PREFERRED EMBODIMENT

Figure 1:
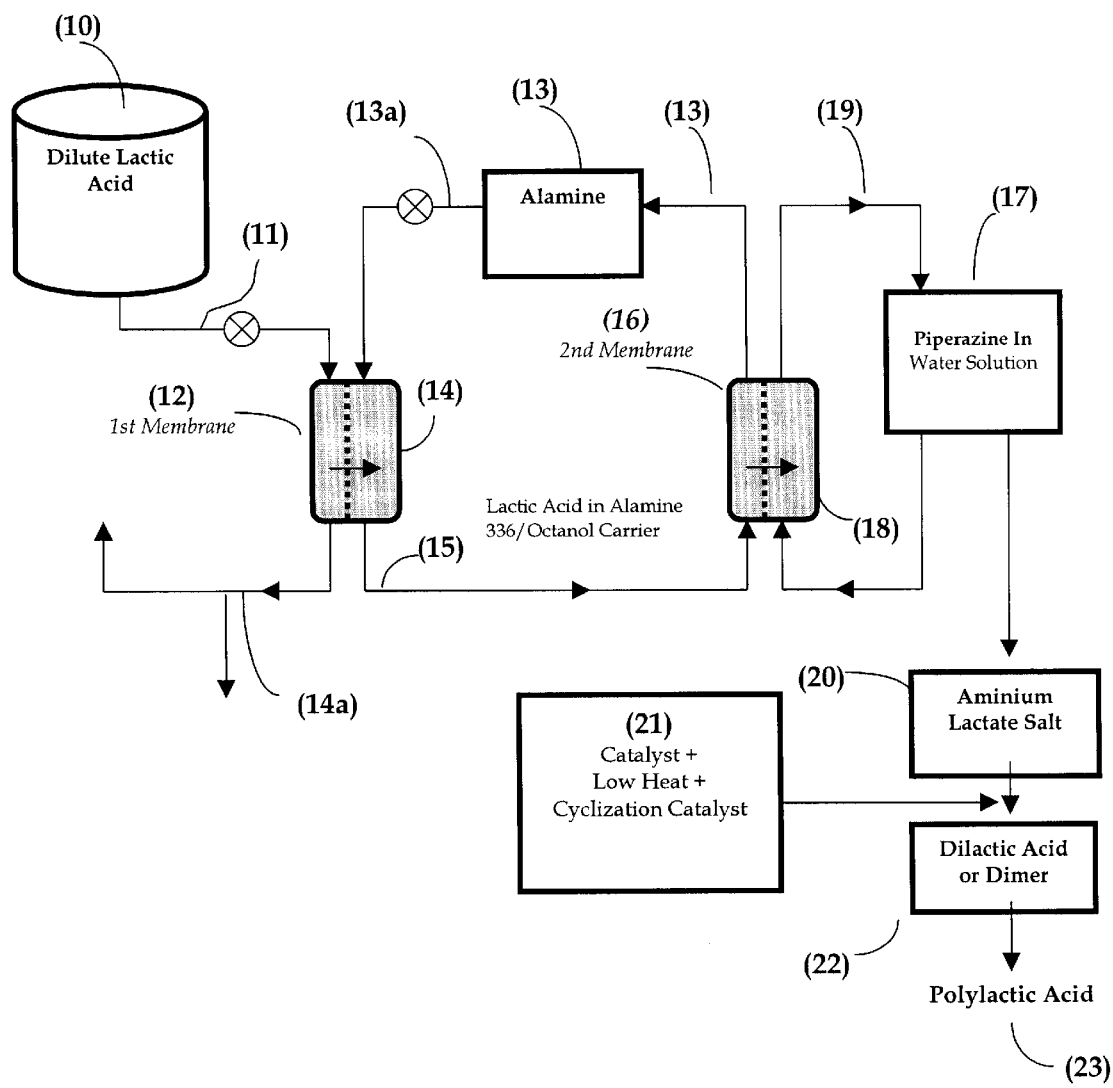
FIG. 1 is a schematic of the preferred embodiment of the process of the present invention. In particular.
Figure 2:
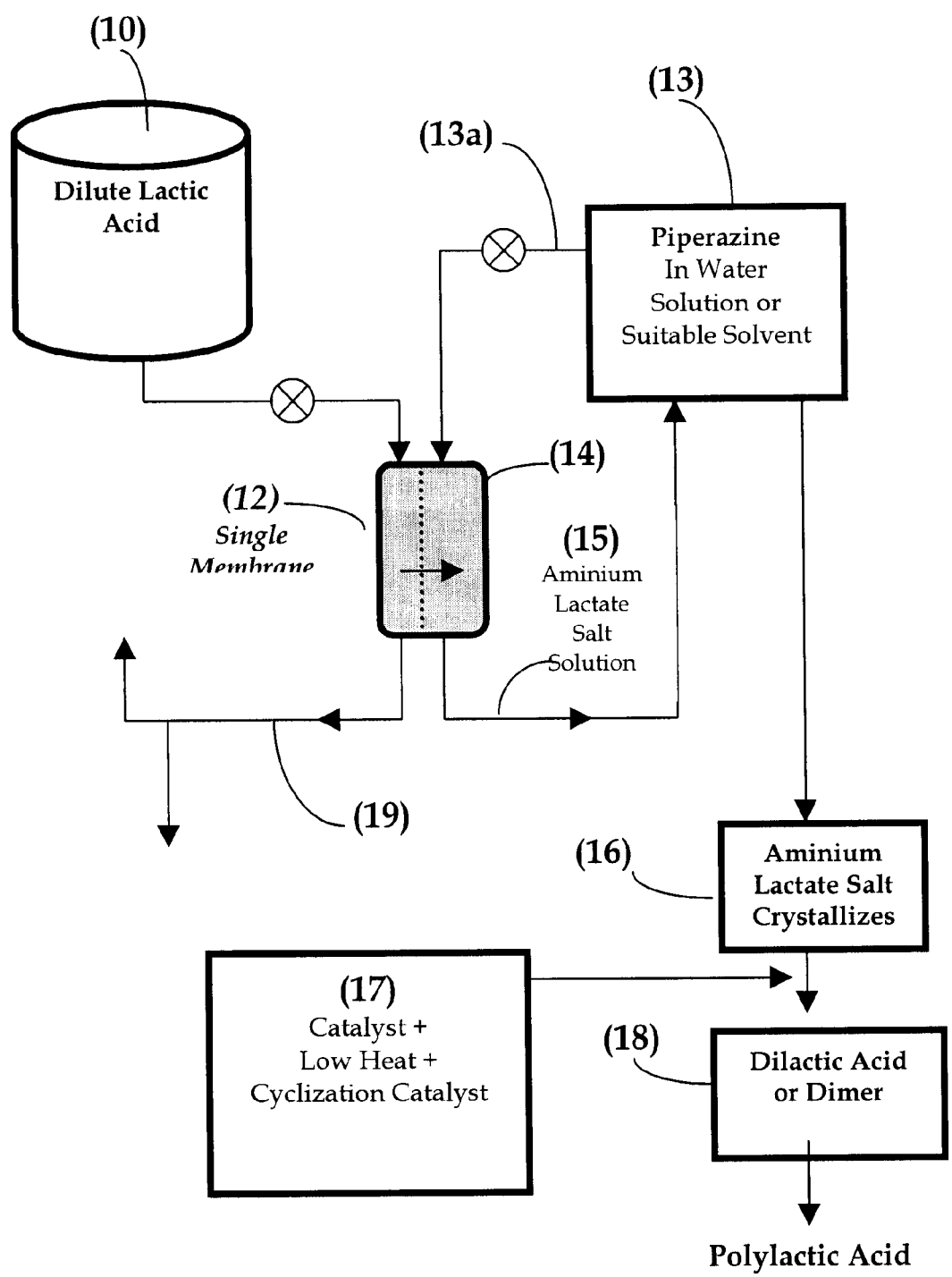
FIG. 2 is a schematic of an alternative process within the scope of the present invention. In particular.

A typical embodiment of the method and/or apparatus of the present invention is illustrated in FIG. 1 and FIG. 2. Like numerals are used for common designations in the figures.

In FIG. 1 a dilute source of lactic acid (10), e.g. acid cheese whey (which contains about 0.4% lactic acid), or other lactic acid fermentation broth, is positioned via line (11) on one side of a membrane (12). Simultaneously on the other side of membrane (12) is placed an alkaline solvent a solution, e.g. Alamine 336/Octanol solvent solution extractant or carrier (13) via line (13a). It can be (80% Alamine 336 in diisobutyl ketone—an aliphatic hydrocarbon—a trioctylphosphinic oxide (octanol) containing a long-chain aliphatic amine, such as a secondary, tertiary and quaternary amine. The base (13) extracts the lactic acid 10 from the fermentation broth. Namely, the lactic acid migrates across the membrane (12) as illustrated at (14) into the alkaline Alamine 336/Octanol solvent extractant carrier side. It is then withdrawn via line 15 to a second membrane (16) and is contacted similarly across said second membrane (16) with an organic amine (heterocyclic amine), e.g. Piperazine in water solution or other suitable solvent from (17). Similarly, this causes the lactic acid to migrate across the second membrane (16) to the base side (18) to back-extract the lactic acid into the Piperazine solution to form aminium lactate salt withdrawn at line (19). It then is crystallized using standard crystallization steps (20). It is dissociated in the presence of a cyclization catalyst (ring-closing catalyst such as acetonitrile, dioxan, ethylene glycol monoethylether, dimethyl sulphoxide-d6) (21) in the presence of an inert gas at low temperatures, to form dilactic acids (dimers) (22) and then may subsequently be polymerized through known ring-opening catalysis to polylactic acid (23). Excess Alamine 336/Octanol solvent (13) is recycled after contacting with said Piperazine solution (17) and spent cheese whey (or other feedstock) is recycled to extract additional lactic acid, or is discarded.

FIG. 2 shows an alternative single step method, also within the scope of this present invention. Here lactic acid fermentation broth, e.g. cheese whey (10) is contacted across a single membrane (12), simultaneously with an organic amine, alkaline solution, e.g. a heterocyclic amine such as Piperazine in water solution, or other suitable solvent (13) which causes the lactic acid to migrate across the membrane (12) to side (14) where it is then extracted directly into the Piperazine solution to form an aminium lactate salt solution drawn off via line (15) which then crystallizes at (16) after recycle thru (13), and is then dissociated in the presence of a cyclization catalyst (ring-closing catalyst such as acetonitrile, dioxan, ethylene glycol monoethylether, dimethyl sulphoxide-d16(a) (17) in the presence of an inert gas at low temperatures to form dilactic acid or dimer (18) which may then be polymerized to polylactic acid (through ring-opening catalysis). Spent cheese whey (or other feedstock) is recycled to lactic acid holding vessel via line (19), or is discarded.

Having described generally the flow of reactants/reagents through the process of the invention, the particularity and continuing references to FIGS. 1 and 2, certain particularized process conditions are worthy of specific mention and are now described herein.

In FIG. 1, Alamine 336 in Octanol solvent (13) is first employed as a carrier or stripping agent to extract dilute lactic acid from dilute fermentation broths (10) across a membrane (12) into the carrier or stripping agent side at (14). In this dual membrane embodiment, the organic amine, e.g. Piperazine in solution or other suitable solvent is used to back extract the lactic acid across a second membrane to form an aminium lactate salt solution at membrane side (18). Therefore, the organic amine, e.g. Piperazine in a suitable solution as the back extracting agent across a second membrane (16) (or by direct contact) to yield aminium lactate salt provides something which can be used directly. This aminium lactate salt is then dissociated to form dilactic acid or dimer. Such aminium salts have lower melt points (80° C.–150° C.) and require less energy and process time to dissociate than impure polylactic acid, the starting material used under the Cargill-Dow patented process, in order to produce polylactic acid polymers. Temperatures required to dehydrate and dissociate impure polylactic acid range from 120° C. to 260° C. and such also requires high vacuum evaporation steps which are energy intensive. For this present invention, Aminium lactate salt is thermally dissociated in an inert gas stream at low temperature (80° C.–120° C.) in the presence of the usual cyclization catalyst (acetonitrile, dioxan, ethylene monoethylether) to form dilactic acids wherein two lactic acid molecules combine as a diester polymer, which diester polymer is then polymerized to polylactic acid through ring-opening techniques. The method of this present invention avoids the energy intensive steps of dehydration of lactic acid, the interim step of forming oligomeric acids and impure polylactic acid and the depolymerization of such impure polymer to form dilactic acids. All of these steps are energy intensive steps currently practiced in the Cargill-Dow patented process. All of these high-energy intensive steps are minimized in the present invention. Either method shown in FIG. 1 or FIG. 2 may be combined with parts of a highly productive lactic acid fermentation process such as the patented Yang process disclosed in U.S. Pat. No. 5,563,069, or with other lactic acid fermentation processes, e.g. free cell, immobilization, cheese whey, etc.

The description of FIGS. 1 and 2 are considered a guide for the present invention, though such mixtures, percentages, formulas shall not be interpreted as being totally restrictive in the present invention, except for the unique and more economical applications as disclosed in this present invention. For example, the present invention may rely upon very controlled titration of the organic amines (such as Piperazine) when used in conjunction with the membranes shown in FIGS. 1 and 2, where such organic amines are contacted across a single or secondary membrane to extract lactic acid to produce aminium lactates either in a dual membrane extraction method (FIG. 1) or in a single membrane extraction step (FIG. 2).

The method of this invention can be used to produce dilactic acids more economically and with less energy expensive steps by producing interim organic amine salts (aminium lactate salts) less expensively than impure polylactic acid, and in a manner which is readily scaleable to commercial operation. And finally, such salt requires less energy, less purification and less process time to dissociate in order to produce dilactic acids (dimers) and subsequent polylactic acid polymers therefrom.

This approach of producing aminium lactate salt for use in the production of dilactic acids (dimers) has the following advantages.

It permits the extraction and avoids the high energy steps of concentration of lactic acid (evaporation, distillation, solvent stripping) by converting the lactic acid into another, more usable form, aminium lactate salt, thereby eliminating the energy expensive step of concentrating said lactic acid.

It allows a method to circumvent the energy intensive steps of having to dehydrate or concentrate lactic acid using expensive evaporation and distillation steps, vaporizing the acid to form an impure polylactic acid polymer, destructuring the polymer to purify it, and repolymerizing the polymer in order to produce a more pure polylactic acid. It permits a method to upscale the use of organic amines (e.g. Piperazine in water solution, or other suitable solvents (e.g. ethylene glycol), when used to extract lactic acid to form aminium salts, (e.g. Piperazinium (L,L) dilactate), a process not heretofore upscaleable. Such salts may then be thermally dissociated by drying (in $P_4O_{10}$) in an inert gas stream at low temperature (80–150 C.) at 0.133 kPa (vacuum) in the presence of the usual cyclization catalysts (e.g. acetonitrile, dioxan, ethylene glycol, monoethylether, etc.) to form dilactic acids (dimers) less expensively.

It provides a method that will allow a more economical way to convert organic environmental wastes into usable biodegradable products which may compete economically with similar petroleum-based products, i.e. polyesters, fibers, polyethylene.

Although the description above contains many specifications, these should not be construed as limiting the scope of the invention but as merely providing illustrations of some of the presently preferred embodiments of this invention. For example, lactic acid fermentation can be accomplished in large-scale "free-cell" applications and organic amines used to convert the lactic acid to aminium lactates.

Thus the scope of the invention should be determined by the of appended claims and their legal equivalents, rather than by the examples or the preferred embodiment described.

What is claimed is:

1. A method of producing polylactic acid from dilactic acids, comprising:

contacting a lactic source acid solution via a membrane with an extracting carrier solvent which contains an aliphatic amine, to extract said lactic acid across said membrane into said extracting carrier solvent;

contacting said extracting carrier solvent via a second membrane, with an organic alkaline heterocyclic amine solution to back-extract said lactic acid source to form aminium lactate salt in water solution;

crystallizing said aminium lactate salt;

dissociating said aminium lactate salt in the presence of a cyclization catalyst and forming dilactic acid dimers; and purifying said dilactic acid dimers.

2. The process of claim 1 wherein the membrane is a porous fibrous membrane material.

3. The process of claim 2 wherein the porous fibrous material is one selected from the group consisting of cotton cloth, medical gauze, polyester fabrics, fiberglass batting, and paper.

4. The process of claim 3 wherein the membrane is in a cell having a housing with one inlet and one outlet and the fibrous matrix material of said membrane is folded upon itself to provide a loosely convoluted configuration generally in the shape of a wound spiral.

5. The process of claim 1 wherein the aliphatic amine solvent is selected from the group consisting of secondary, tertiary, and quaternary amine solvents.

6. The process of claim 1 wherein said aminium lactate salt is crystallized in the presence of an inert gas at temperatures within the range of 80° C.–150° C.

7. The process of claim 6 wherein the crystallization of said aminium salt occurs in the presence of a cyclization catalyst.

8. The process of claim 7 wherein the cyclization catalyst is selected from the group consisting of acetonitrile, dioxane, ethylene glycol, monoethylether and dimethyl sulfoxide.

9. The process of claim 1 wherein purifying of the dilactic acid dimer is a accomplished using ring opening catalysis.

10. A method of producing dilactic acid dimers for subsequent production of polylactic acid in single membrane process comprising:

contacting a lactic acid solution across a membrane with an organic heterocyclic amine base to form aminium lactate salt in water solution on one side of the membrane;

crystallizing the formed aminium lactate salt;

dissociating said formed aminium lactate salt in the presence of a cyclization catalyst to form dilactic acid dimer; and purifying said dilactic acid or dimer to form polylactic acid polymer.

11. The process of claim 10 wherein the membrane is a porous fibrous membrane material.

12. The process of claim 11 wherein the porous fibrous material is one selected from the group consisting of cotton cloth, medical gauze, polyester fabrics, fiberglass batting, and paper.

13. The process of claim 12 wherein the membrane is in a cell having a housing with one inlet and one outlet and the fibrous matrix material of said membrane is folded upon itself to provide a loosely convoluted configuration generally in the shape of a wound spiral.

14. The process of claim 13 wherein the aliphatic amine solvent is selected from the group consisting of secondary, tertiary, and quaternary amine solvents.

15. The process of claim 14 wherein said aminium lactate salt is crystallized in the presence of an inert gas at temperatures within the range of 80° C.–150° C.

16. The process of claim 15 wherein the crystallization of said aminium salt occurs in the presence of a cyclization catalyst.

17. The process of claim 16 wherein the cyclization catalyst is selected from the group consisting of acetonitrile, dioxane, ethylene glycol, monoethylether and dimethyl sulfoxide.

18. The process of claim 17 wherein purifying of the dilactic acid dimer is accomplished using ring opening catalysis.

* * * * *